US010626932B2

(12) United States Patent
Yokomichi et al.

(10) Patent No.: US 10,626,932 B2
(45) Date of Patent: Apr. 21, 2020

(54) CENTRIFUGAL CLUTCH (71) Applicant: Kabushiki Kaisha F.C.C., Hamamatsu-shi, Shizuoka (JP)

(72) Inventors: Yuta Yokomichi, Hamamatsu (JP); Yuta Kine, Hamamatsu (JP); Kaoru Aono, Hamamatsu (JP); Makoto Kataoka, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 16/316,852

(22) PCT Filed: Jun. 26, 2017

(86) PCT No.: PCT/JP2017/023386
§ 371 (c)(1),
(2) Date: Jan. 10, 2019

(87) PCT Pub. No.: WO2018/012263
PCT Pub. Date: Jan. 18, 2018

(65) Prior Publication Data
US 2019/0186558 A1    Jun. 20, 2019

(30) Foreign Application Priority Data
Jul. 15, 2016    (JP) .................. 2016-140425

(51) Int. Cl.
*F16D 43/18*    (2006.01)
*F16D 43/22*    (2006.01)
*F16D 43/14*    (2006.01)
(52) U.S. Cl.
CPC ............. *F16D 43/18* (2013.01); *F16D 43/22* (2013.01); *F16D 2043/145* (2013.01)

(58) Field of Classification Search
CPC .... F16D 2043/145; F16D 43/14; F16D 43/18; F16D 43/22
See application file for complete search history.

(56) References Cited

U.S. PATENT DOCUMENTS 1,967,749 A  *  7/1934  Ferguson ................ F16D 43/18
                                                   192/41 R
2,087,968 A     7/1937  Dodge
(Continued)

FOREIGN PATENT DOCUMENTS

JP    S49109752 A    10/1974
JP    S53072047 U     6/1978
(Continued)

OTHER PUBLICATIONS

International Search Report dated Sep. 26, 2017 filed in PCT/JP2017/023386.

*Primary Examiner* — Jacob S. Scott
*Assistant Examiner* — Lori Wu
(74) *Attorney, Agent, or Firm* — Rankin, Hill & Clark LLP (57)    ABSTRACT

Provided is a centrifugal clutch having a simple configuration and configured so that a clutch capacity can be increased. A centrifugal clutch (200) includes a drive plate (210) to be directly rotatably driven by drive force of an engine. The drive plate (210) includes swing support pins (214) and protrusions (218). The swing support pin (214) is fitted in a pin slide hole (231) formed at a clutch weight (230), and swingably supports the clutch weight (230). The protrusion (218) includes a cylindrical roller, and contacts a driven portion (235) of the clutch weight (230). The pin slide hole (231) is formed in a long hole shape allowing the clutch weight (230) to displace backward in a rotary drive direction of the drive plate (210). The driven portion (235) is formed (Continued)

to extend inclined outward to a rear side in the rotary drive direction of the drive plate (210).

12 Claims, 9 Drawing Sheets

(56)  References Cited

U.S. PATENT DOCUMENTS

| | | | |
|---|---|---|---|
| 3,251,445 | A | 5/1966 | Zuck et al. |
| 3,971,462 | A | 7/1976 | Johansson |
| 5,257,685 | A * | 11/1993 | Tichiaz ................. F02N 15/027 |
| | | | 192/104 C |
| 5,908,101 | A * | 6/1999 | Watanabe ............... F16D 43/18 |
| | | | 192/223 |
| 2008/0053783 | A1 | 3/2008 | Lean |
| 2011/0240433 | A1 | 10/2011 | Fang |
| 2013/0341451 | A1 * | 12/2013 | Saito ....................... B60R 22/46 |
| | | | 242/381.5 |

FOREIGN PATENT DOCUMENTS

| | | |
|---|---|---|
| JP | S59094624 U | 6/1984 |
| JP | H02078822 U | 6/1990 |
| JP | 2006038124 A | 2/2006 |
| JP | 3134915 U | 8/2007 |
| JP | 3168535 U | 6/2011 |
| JP | 2015203429 A | 11/2015 |
| TW | 201432175 A | 8/2014 |

\* cited by examiner

CENTRIFUGAL CLUTCH

TECHNICAL FIELD

The present invention relates to a centrifugal clutch configured to block transmission of rotary drive force to a driven side until an engine reaches a predetermined rotation speed and transmit the rotary drive force to the driven side when the engine reaches the predetermined rotation speed.

BACKGROUND ART

Typically, a centrifugal clutch configured to transmit rotary drive force to a driven side when an engine reaches a predetermined rotation speed has been used for, e.g., a motorcycle or a lawn mower. For example, according to a centrifugal clutch disclosed in Patent Literature 1, a clutch weight provided at a single drive plate is gradually displaced toward a clutch outer as an engine speed increases. Then, a clutch shoe provided at the clutch weight friction-contacts the clutch weight. According to a configuration of a centrifugal clutch disclosed in Patent Literature 2, a cam body and a clutch weight are provided at each of first and second drive plates rotatable relative to each other. Moreover, part of the clutch weight is configured to climb on the cam body. Thus, according to the centrifugal clutch described in Patent Literature 2, a so-called clutch capacity as the level of power which can be transmitted by a clutch shoe strongly pressing a clutch outer can be increased.

CITATION LIST

Patent Literature

PATENT LITERATURE 1: JP-A-2006-38124
PATENT LITERATURE 2: JP-A-2015-203429

SUMMARY OF THE INVENTION

However, according to the centrifugal clutch described in Patent Literature 1, the clutch weight gradually comes into friction-contact with the clutch outer according to an increase in the engine speed. Thus, a long time is necessary until the clutch is brought into a coupling state after the engine speed has started increasing. For this reason, there is a problem that fuel efficiency is lowered and the clutch capacity is small. On the other hand, according to the centrifugal clutch described in Patent Literature 2, the drive plates rotatable by engine rotation include two drive plates, i.e., the first and second drive plates. Thus, there is a problem that the configuration is complicated due to an increase in the number of components and a manufacturing burden increases.

The present invention has been made for addressing the above-described problems. An objective of the present invention is to provide a centrifugal clutch having a simple configuration and configured so that a clutch capacity can be increased.

To fulfill the above-described objective, the present invention features an centrifugal clutch including: a drive plate to be rotatably driven together with a driven pulley in response to drive force of an engine; a clutch outer positioned outside the drive plate and having a cylindrical surface provided concentrically with the drive plate; a clutch weight having a clutch shoe formed to extend along a circumferential direction of the drive plate and facing a cylindrical surface of the clutch outer; a protrusion provided to protrude toward the clutch weight on the drive plate; and a driven portion provided at the clutch weight, wherein one end side of the clutch weight in the circumferential direction is rotatably attached onto the drive plate via a swing support pin and a pin slide hole, the other end side of the clutch weight in the circumferential direction is displaced toward a cylindrical surface side of the clutch outer, the clutch weight climbs on the protrusion upon displacement of the other end side of the clutch weight, the swing support pin is provided at one of the drive plate or the clutch weight, and is formed to extend toward the other one of the drive plate or the clutch weight, the pin slide hole is provided at the other one of the drive plate or the clutch weight, and is formed in a long hole shape allowing one end side of the clutch weight to displace backward in a rotary drive direction of the drive plate, and the swing support pin is slidably fitted in the pin slide hole. The long hole described herein is a through-hole or a blind hole elongated as a whole. That is, the length of the long hole in one direction is longer than that in a width direction perpendicular to the one direction.

According to the feature of the present invention configured as described above, the drive plate and the clutch weight of the centrifugal clutch are coupled to each other via the long hole-shaped pin slide hole in which both of the drive plate and the clutch weight are slidably fitted and the swing support pin. Thus, when the drive plate is rotatably driven to cause the clutch shoe to contact the clutch outer, the clutch weight shifts backward in the rotary drive direction. Then, the driven portion climbs on the protrusion. As a result, the clutch shoe quickly presses the clutch outer. That is, according to the centrifugal clutch, the clutch shoe can be strongly pressed against the clutch outer even by the single drive plate. Thus, the clutch capacity can be increased with a simple configuration.

Another feature of the present invention is that the swing support pin of the centrifugal clutch is provided at the drive plate and the pin slide hole of the centrifugal clutch is provided at the clutch weight.

According to another feature of the centrifugal clutch of the present invention configured as described above, the swing support pin of the centrifugal clutch is provided at the drive plate, and the pin slide hole is provided at the clutch weight. Thus, a clutch weight manufacturing burden can be more reduced as compared to a case where the swing support pin is provided at the clutch weight.

Still another feature of the present invention is that the pin slide hole of the centrifugal clutch is made of a material less resistant to wear than the swing support pin. In this case, the pin slide hole may be made of a material exhibiting lower hardness than that of the swing support pin, for example. Specifically, the pin slide hole may be made of a zinc material, and the swing support pin may be made of carbon steel or an iron-based sintered material, for example. Moreover, the pin slide hole may be made of the same material as that of the swing support pin, and surface hardening processing such as thermal processing or coating may be performed for the swing support pin, for example. In this manner, wear resistance of the pin slide hole can be more improved.

According to still another feature of the centrifugal clutch of the present invention configured as described above, the pin slide hole of the centrifugal clutch is made of the material less resistant to wear than the swing support pin. Thus, the pin slide hole is more easily worn away than the swing support pin. In this case, the pin slide hole is formed at the clutch weight including the clutch shoe. Thus, the pin slide hole is also updated by replacement of the clutch weight having the worn-out clutch shoe. That is, for the centrifugal clutch, the pin slide hole can be replaced with a new slide hole at the same time by the process of replacing the clutch weight having the worn-out clutch shoe. Thus, a maintenance burden can be reduced.

Still another feature of the present invention is that the pin slide hole of the centrifugal clutch is formed as a long hole having such a length that no contact of the swing support pin occurs even when one end side of the clutch weight is displaced backward in the rotary drive direction of the drive plate.

According to still another feature of the present invention configured as described above, the pin slide hole is formed as the long hole having such a length that a clearance is ensured to such an extent that the swing support pin does not contact an end portion of the pin slide hole even in a case where one end side of the clutch weight of the centrifugal clutch is displaced backward in the rotary drive direction of the drive plate. Thus, when the clutch weight is displaced backward in the rotary drive direction of the drive plate, the driven portion can sufficiently climb on the protrusion. As a result, the clutch shoe can be more strongly pressed against the clutch outer.

Still another feature of the present invention is that at least one of the protrusion or the driven portion of the centrifugal clutch includes a rotatably-supported roller.

According to still another feature of the centrifugal clutch of the present invention configured as described above, at least one of the protrusion or the driven portion of the centrifugal clutch includes the rotatable roller. Thus, when the protrusion and the driven portion are pressed against each other, the roller of at least one of the protrusion or the driven portion rotates. Thus, a friction resistance increase due to friction slide between the protrusion and the drive portion and damage due to wear can be reduced. Note that in this case, one of the protrusion or the driven portion may include the roller, and the other one of the protrusion or the driven portion may be formed in a planar shape or a curved shape. Alternatively, each of the protrusion and the driven portion may include the roller.

DESCRIPTION OF THE EMBODIMENTS

Figure 1:
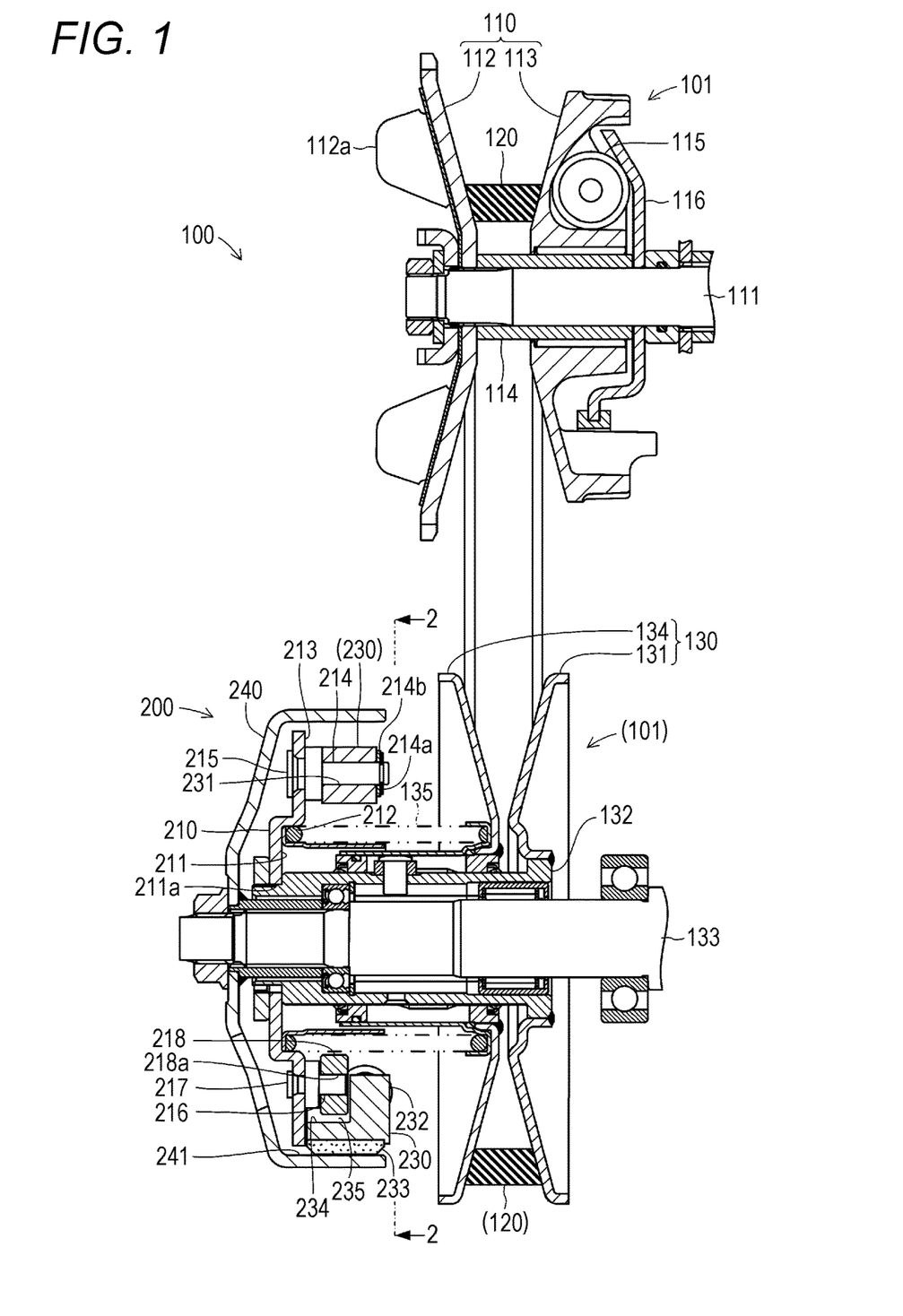
FIG. 1 is a schematic plan sectional view of a configuration of a power transmission mechanism including a centrifugal clutch according to the present invention.
Figure 2:
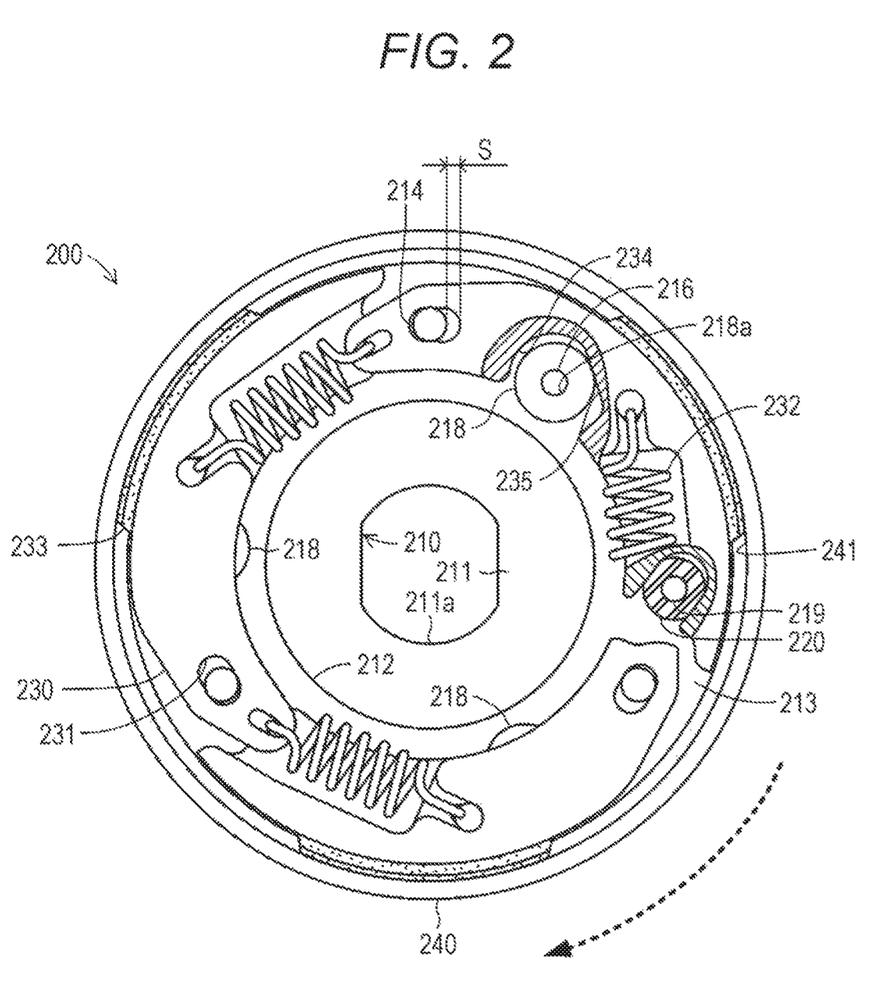
FIG. 2 is a side view of the centrifugal clutch from a 2-2 line illustrated in FIG. 1.

Hereinafter, one embodiment of a centrifugal clutch according to the present invention will be described with reference to the drawings. FIG. 1 is a schematic plan sectional view of a configuration of a power transmission mechanism 100 including a centrifugal clutch 200 according to the present invention. Moreover, FIG. 2 is a side view of the centrifugal clutch 200 from a 2-2 line illustrated in FIG. 1. The power transmission mechanism 100 including the centrifugal clutch 200 is mainly provided between an engine and a rear wheel as a drive wheel at a motorcycle vehicle such as a scooter. The power transmission mechanism 100 is a mechanical device configured to transmit rotary drive force to the rear wheel or block the rotary drive force while automatically changing a reduction ratio to an engine speed.

(Configuration of Centrifugal Clutch 200)

The power transmission mechanism 100 mainly includes a transmission 101 and the centrifugal clutch 200. The transmission 101 is a mechanical device configured to steplessly decelerate the rotary drive force from the not-shown engine to transmit the rotary drive force to the centrifugal clutch 200. The transmission 101 mainly includes a drive pulley 110, a V-belt 120, and a driven pulley 130. Of these components, the drive pulley 110 is a mechanical device which is provided on a crank shaft 111 extending from the engine and which is to be directly rotatably driven by the rotary drive force of the engine. The drive pulley 110 mainly includes a fixed drive plate 112 and a movable drive plate 113.

The fixed drive plate 112 and the movable drive plate 113 both hold the V-belt 120 with the V-belt 120 being sandwiched between the fixed drive plate 112 and the movable drive plate 113. The fixed drive plate 112 is a component to be rotatably driven in this state. The fixed drive plate 112 is made of a metal material in a conical tubular shape. The fixed drive plate 112 is attached onto the crank shaft 111 in a fixed manner in a state in which a raised-side surface thereof faces a movable drive plate 113 side (an engine side). That is, the fixed drive plate 112 is constantly rotatably driven together with the crank shaft 111. Moreover, multiple radiation fins 112a are radially provided about the axis of the crank shaft 111 on a recessed-side surface of the fixed drive plate 112.

The movable drive plate 113 and the fixed drive plate 112 both hold the V-belt 120 with the V-belt 120 being sandwiched between the movable drive plate 113 and the fixed drive plate 112. The movable drive plate 113 is a component to be rotatably driven in this state. The movable drive plate 113 is made of a metal material in a conical tubular shape. The movable drive plate 113 is attached to the crank shaft 111 in a state in which a raised-side surface thereof faces the fixed drive plate 112. In this case, the movable drive plate 113 is, through an impregnated bush, attached to a sleeve bearing 114 fitted onto the crank shaft 111 in a fixed manner. The movable drive plate 113 is attached to freely slide in each of an axial direction and a circumferential direction relative to the sleeve bearing 114.

Moreover, multiple roller weights 115 are provided on a recessed-side surface of the movable drive plate 113 in a state in which the roller weights 115 are pressed by a ramp plate 116. The roller weight 115 is displaced outward in a radial direction according to an increase in the rotation speed of the movable drive plate 113. The roller weight 115 is a component configured to cooperate with the ramp plate 116 to press the movable drive plate 113 toward the fixed drive plate 112. The roller weight 115 is made of a metal material in a tubular shape. Moreover, the ramp plate 116 is a component configured to press the roller weights 115 toward the movable drive plate 113. The ramp plate 116 is formed from a metal plate bent toward the movable drive plate 113.

The V-belt 120 is a component configured to transmit rotary drive force of the drive pulley 110 to the driven pulley 130. The V-belt 120 is formed in an endless ring shape from a core covered with a resin material. The V-belt 120 is arranged between the fixed drive plate 112 and the movable drive plate 113 and between a fixed driven plate 131 and a movable driven plate 134 at the driven pulley 130, and is bridged between the drive pulley 110 and the driven pulley 130.

The driven pulley 130 is a mechanical device to be rotatably driven by the rotary drive force transmitted from the engine via each of the drive pulley 110 and the V-belt 120. The driven pulley 130 mainly includes the fixed driven plate 131 and the movable driven plate 134.

The fixed driven plate 131 and the movable driven plate 134 both hold the V-belt 120 with the V-belt 120 being sandwiched by the fixed driven plate 131 and the movable driven plate 134. The fixed driven plate 131 is a component to be rotatably driven in this state. The fixed driven plate 131 is made of a metal material in a conical tubular shape. The fixed driven plate 131 is attached onto a driven sleeve 132 in a fixed manner in a state in which a raised-side surface thereof faces a movable driven plate 134 side.

The driven sleeve 132 is a metal tubular component to be rotatably driven together with the fixed driven plate 131. The driven sleeve 132 is attached to a drive shaft 133 via a bearing to freely rotate relative to the drive shaft 133. The drive shaft 133 is a metal rotary shaft configured to drive the rear wheel of the motorcycle vehicle provided with the power transmission mechanism 100 via the not-shown transmission. In this case, the rear wheel of the motorcycle vehicle is attached to one (the right side as viewed in the figure) end portion of the drive shaft 133.

The movable driven plate 134 and the fixed driven plate 131 both hold the V-belt 120 with the V-belt 120 being sandwiched between the movable driven plate 134 and the fixed driven plate 131. The movable driven plate 134 is a component to be rotatably driven in this state. The movable driven plate 134 is made of a metal material in a conical tubular shape. The movable driven plate 134 is fitted onto the driven sleeve 132 to freely slide in the axial direction relative to the driven sleeve 132 in such a direction that a raised-side surface of the movable driven plate 134 faces the fixed driven plate 131.

Moreover, a torque spring 135 is provided between a recessed-side surface of the movable driven plate 134 and a drive plate 210 of the centrifugal clutch 200. The torque spring 135 is a coil spring configured to elastically press the movable driven plate 134 toward the fixed driven plate 131. That is, the transmission 101 steplessly changes the engine speed according to a magnitude relationship between a diameter defined for sandwiching the V-belt 120 by a spacing between the fixed drive plate 112 and the movable drive plate 113 and a diameter defined for sandwiching the V-belt 120 by a spacing between the fixed driven plate 131 and the movable driven plate 134. Moreover, the centrifugal clutch 200 is provided on a tip end side of each of the driven sleeve 132 and the drive shaft 133.

The centrifugal clutch 200 is a mechanical device configured to transmit the engine rotary drive force transmitted via the transmission 101 to the drive shaft 133 or block the engine rotary drive force. The centrifugal clutch 200 mainly includes the drive plate 210, three clutch weights 230, and a clutch outer 240.

Figure 3:
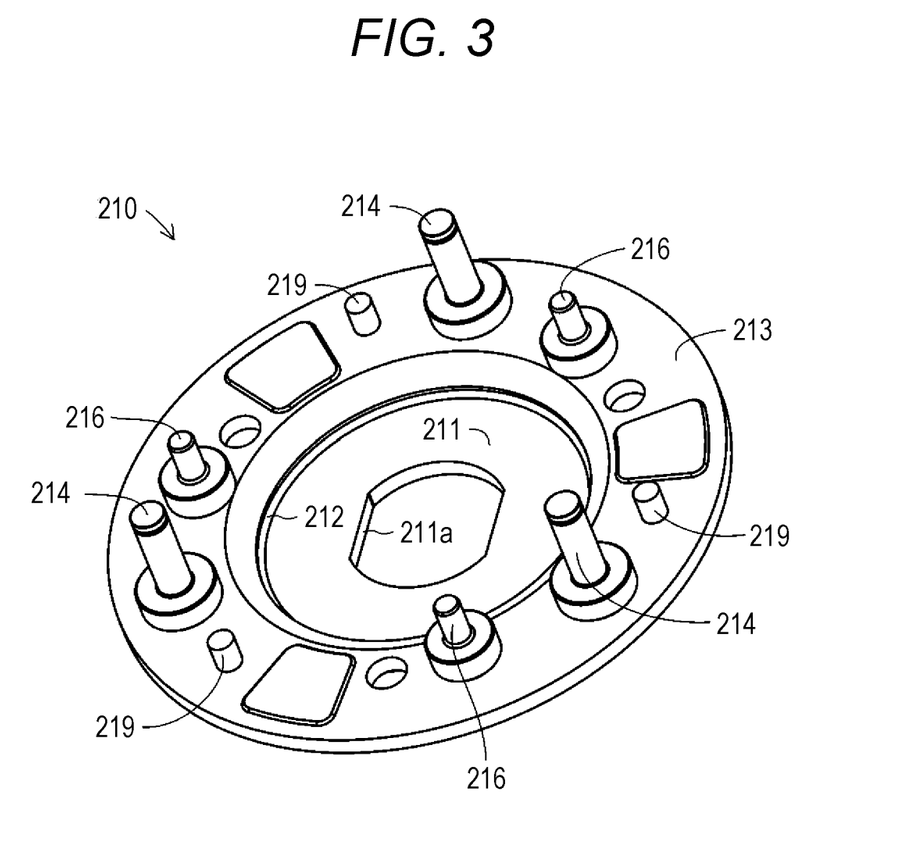
FIG. 3 is a schematic perspective view of an outer appearance configuration of a drive plate in the centrifugal clutch illustrated in each of FIGS. 1 and 2.

The drive plate 210 is a component to be rotatably driven together with the driven sleeve 132. The drive plate 210 is made of a metal material in a stepped discoid shape. More specifically, the drive plate 210 has, as illustrated in FIG. 3, a through-hole 211a formed at a center portion of a flat plate-shaped bottom portion 211, the driven sleeve 132 penetrating the through-hole 211a. In addition, the drive plate 210 has a flange portion 213 formed at a tip end portion of a tubular portion 212 standing around the bottom portion 211 and projecting in a flange shape. Three swing support pins 214, three protrusion support pins 216, and three damper receiving pins 219 are provided at equal intervals along the circumferential direction at the flange portion 213.

The swing support pin 214 is configured to rotatably support one end side of the later-described clutch weight 230. Thus, the swing support pin 214 is a component configured to swing the other end side. The swing support pin 214 includes a metal stepped rod. In this case, the swing support pin 214 is made of a less-friction material than a material forming an inner peripheral surface of a pin slide hole 231 of the clutch weight 230. Specifically, the swing support pin 214 is made of carbon steel or iron-based sintered material. The swing support pin 214 is attached to the flange portion 213 in a fixed manner by an attachment bolt 215. Moreover, the swing support pin 214 pinches and supports the clutch weight 230 via each of an E-ring 214a attached to a tip end portion of the swing support pin 214 and a ring-shaped side plate 214b arranged between the E-ring 214a and the clutch weight 230.

The protrusion support pin 216 is a component configured to support a protrusion 218 in a freely-rotatable state. The protrusion support pin 216 includes a metal stepped rod. The protrusion support pin 216 is, via an attachment bolt 217, attached in a fixed manner onto the flange portion 213 facing a tip end side portion of the clutch weight 230 with respect to the pin slide hole 231 of the clutch weight 230.

Figure 4:
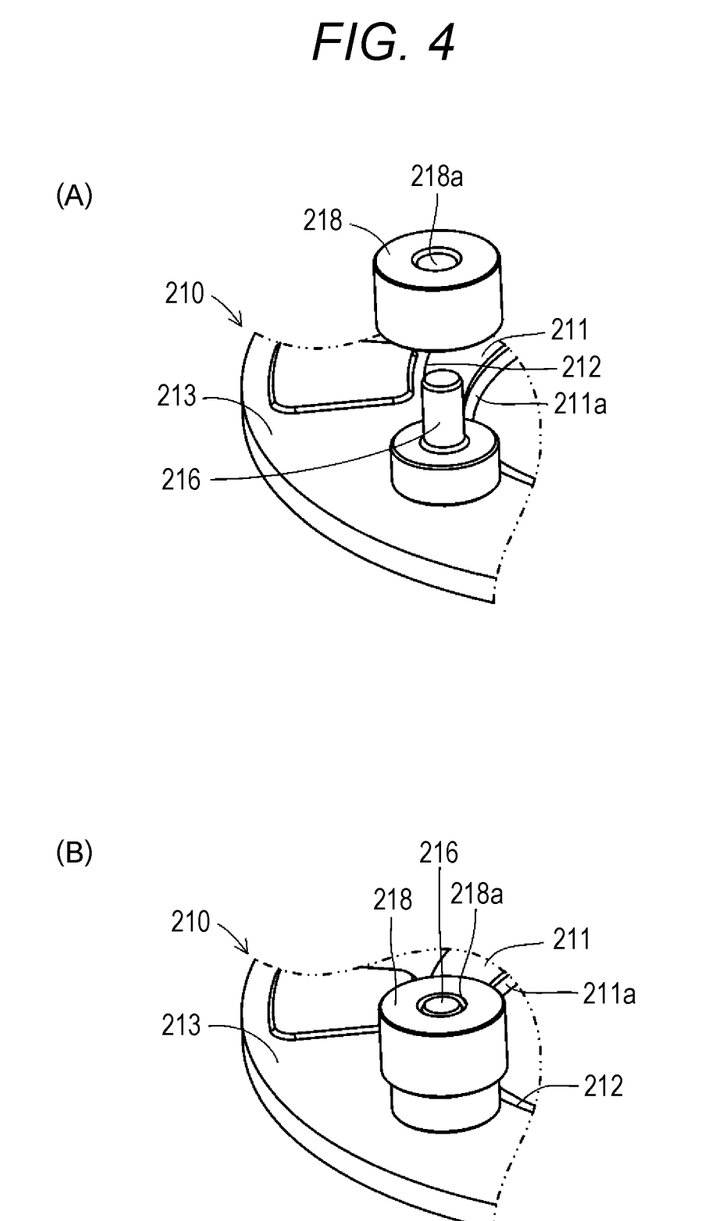
FIGS. 4(A) and 4(B) illustrate an outer appearance configuration of a protrusion in the centrifugal clutch illustrated in each of FIGS. 1 and 2, FIG. 4(A) being a partial enlarged perspective view of a state before assembly of the protrusion from the outside of the drive plate and FIG. 4(B) being a partial enlarged perspective view of a state of assembly of the protrusion from the outside of the drive plate.

The protrusion 218 is a component configured to press the clutch weight 230 toward the clutch outer 240. The protrusion 218 is made of a metal material (e.g., carbon steel or iron-based sintered material) in a cylindrical shape. More specifically, as illustrated in each of FIGS. 4(A) and 4(B), a through-hole 218a through which the protrusion support pin 216 penetrates is formed at a center portion of a circular columnar body of the protrusion 218. In this case, the through-hole 218a is formed to have such an inner diameter that rotary sliding relative to the protrusion support pin 216 is allowed, i.e., have a dimension tolerance as a so-called clearance fit for the protrusion support pin 216.

The damper receiving pin 219 is a component configured to support a damper 220. The damper receiving pin 219 includes a metal rod. The damper 220 is configured to guide swing motion for approaching the other end side of the clutch weight 230 to the clutch outer 240 or separating the other end side from the clutch outer 240. Moreover, the damper receiving pin 219 is a component as a buffer material upon separation. The damper receiving pin 219 is made of a rubber material in a cylindrical shape. The damper 220 is fitted onto an outer peripheral surface of the damper receiving pin 219 in a fixed manner.

Figure 5:
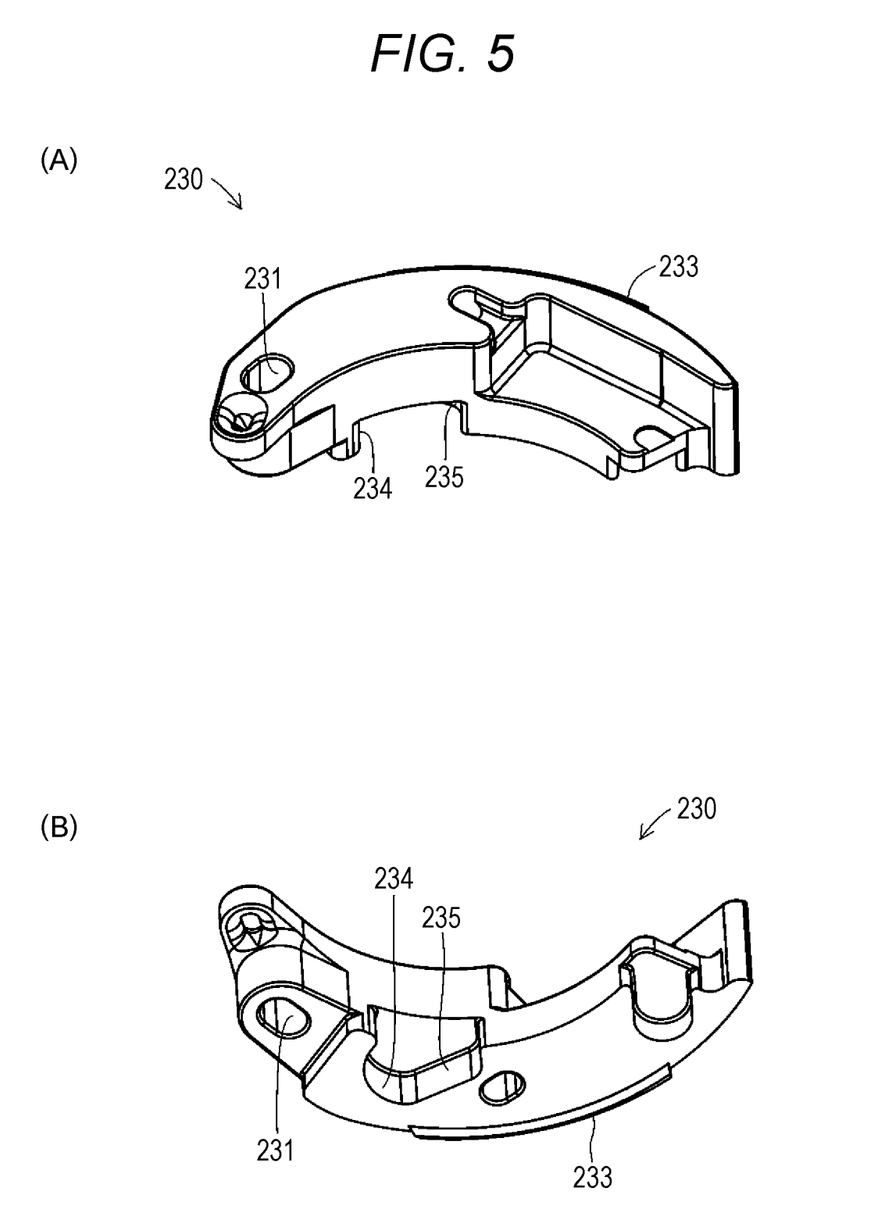
FIGS. 5(A) and 5(B) illustrate an outer appearance configuration of a clutch weight in the centrifugal clutch illustrated in each of FIGS. 1 and 2, FIG. 5(A) being a perspective view of the clutch weight from one surface side and FIG. 5(B) being a perspective view of the clutch weight from the other surface side on the opposite side.

As illustrated in each of FIGS. 5(A) and 5(B), each of three clutch weights 230 is configured to contact the clutch outer 240 via a clutch shoe 233 or separate from the clutch outer 240 according to the rotation speed of the drive plate 210. The clutch weight 230 is a component configured to transmit the rotary drive force from the engine to the drive shaft 133 or block the rotary drive force as described above. The clutch weight 230 is made of a metal material (e.g., a zinc material) in a curved shape extending along a circumferential direction of the drive plate 210.

One end side of each of these clutch weights 230 is rotatably supported by the swing support pin 214 via the pin slide hole 231. In this state, the other end side of each of the clutch weights 230 is coupled to the adjacent clutch weight 230 via a coupling spring 232. In this manner, the clutch weight 230 is pulled inward of the drive plate 210. That is, in the clutch weight 230, the other end side provided with the clutch shoe 233 is freely swingable relative to the clutch outer 240. In this state, the clutch weight 230 is supported on the drive plate 210 via each of the swing support pin 214 and the pin slide hole 231.

Note that in FIG. 2, two spots of one of three clutch weights 230 are each illustrated at different cut planes along a thickness direction for the sake of easy illustration of a configuration of the clutch weight 230. Moreover, in FIG. 2, each of the E-ring 214a and the side plate 214b is not shown.

The pin slide hole 231 is a portion in which the swing support pin 214 of the drive plate 210 is to be rotatably and swingably fitted. The pin slide hole 231 includes a through-hole penetrating the clutch weight 230 in the thickness direction thereof. The pin slide hole 231 is formed in a long hole shape such that one end side of the clutch weight 230 is displaced backward in a rotary drive direction of the drive plate 210 when the clutch shoe 233 contacts the clutch outer 240.

In this case, in the long hole forming the pin slide hole 231, a length in one direction is longer than that in a width direction perpendicular to the one direction. That is, the pin slide hole 231 is entirely formed elongated. More specifically, the pin slide hole 231 is formed to have an inner diameter corresponding to such a clearance fit size that a size in the width direction coincident with a radial direction of the drive plate 210 is slightly larger than the outer diameter of the swing support pin 214. Moreover, the pin slide hole 231 is formed to extend in an arc shape or a linear shape in a longitudinal direction of the pin slide hole 231, more specifically in a direction in which the clutch weight 230 can be displaced to a side on which climbing of a driven portion 235 of the clutch weight 230 upon an increase in pressing of the protrusion 218 against the driven portion 235 is more promoted.

In the present embodiment, the pin slide hole 231 is formed to extend, in an arc shape, forward in the rotary drive direction of the drive plate 210. In this case, the pin slide hole 231 is concentric with the drive plate 210 in the present embodiment. Note that the pin slide hole 231 and the drive plate 210 are not necessarily concentric with each other.

The clutch shoe 233 is a component configured to increase friction force for an inner peripheral surface of the clutch outer 240. The clutch shoe 233 is made of a wear material in a plate shape extending in an arc shape. The clutch shoe 233 is provided on a tip-end-side outer peripheral surface of each clutch weight 230 opposite to the pin slide hole 231.

Moreover, a protrusion clearance portion 234 formed in a recessed shape to cover the protrusion 218 is formed at a portion of an inner peripheral surface of each clutch weight 230 facing the protrusion 218 of the drive plate 210. The driven portion 235 constantly contacting the protrusion 218 is formed at part of an inner peripheral portion of the protrusion clearance portion 234. In addition, the remaining part is cut out in an arc shape not to contact the protrusion 218.

The driven portion 235 is a portion configured to cooperate with the protrusion 218 to displace the clutch weight 230 toward the clutch outer 240. The driven portion 235 includes a flat inclined surface facing a rear side in the rotary drive direction of the drive plate 210. More specifically, the driven portion 235 is formed to extend inclined outward to the rear side in the rotary drive direction of the drive plate 210. Moreover, the thickness of the driven portion 235 is formed to be wider than the thickness of the protrusion 218. Further, the driven portion 235 is made of a material less resistant to wear than the protrusion 218. In the present embodiment, the driven portion 235 is made of the same metal material (e.g., the zinc material) as that of the clutch weight 230.

The clutch outer 240 is a component to be rotatably driven together with the drive shaft 133. The clutch outer 240 is made of a metal material in a cup shape covering the outer peripheral surface of the clutch weight 230 from the drive plate 210. That is, the clutch outer 240 has a cylindrical surface 241 friction-contacting the clutch shoe 233 of the clutch weight 230 displaced to an outer peripheral side of the drive plate 210.

(Operation of Centrifugal Clutch 200)

Figure 6:
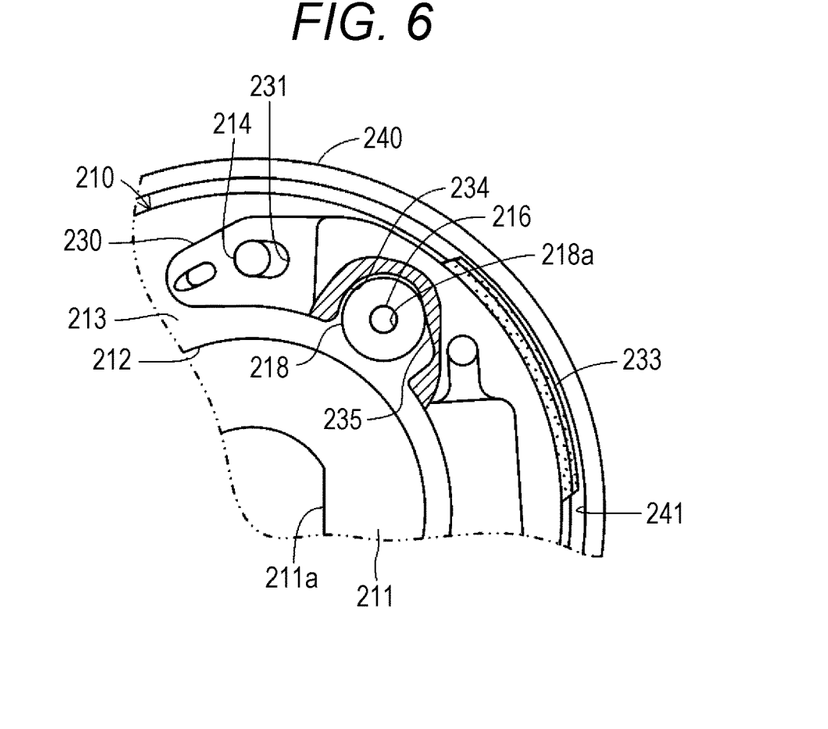
FIG. 6 is a partial enlarged view of a disconnection state in which a clutch shoe does not contact a clutch outer in the centrifugal clutch illustrated in FIG. 2.

Next, operation of the centrifugal clutch 200 configured as described above will be described. For causing the centrifugal clutch 200 to function, the centrifugal clutch 200 forms part of the power transmission mechanism 100 arranged between the engine and the rear wheel as the drive wheel at the motorcycle vehicle (e.g., the scooter). First, the centrifugal clutch 200 blocks transmission of the drive force between the engine and the drive shaft 133 as illustrated in FIG. 6 in an idling state of the engine. Specifically, in the centrifugal clutch 200, the drive plate 210 is rotatably driven by the rotary drive force of the engine transmitted via the transmission 101. In this manner, the clutch weight 230 is rotatably driven.

However, in this case, centrifugal force acting on the clutch weight 230 of the centrifugal clutch 200 is smaller than elastic force (pull force) of the coupling spring 232. Thus, the clutch shoe 233 does not contact the cylindrical surface 241 of the clutch outer 240. As a result, the rotary drive force of the engine is not transmitted to the drive shaft 133. Moreover, in this case, the driven portion 235 maintains a state in which the driven portion 235 is pressed in contact with a roller surface of the protrusion 218 by the elastic force (the pull force) of the coupling spring 232.

Then, the clutch weight 230 is pulled by the pull force of the coupling spring 232 (the coupling spring 232 hooked at a position adjacent to the driven portion 235) pulling from a position farther from the swing support pins 214 among two coupling springs 232 coupled to the clutch weight 230. In this case, the clutch weight 230 is configured such that the pin slide hole 231 is formed in the long hole shape. Thus, the clutch weight 230 is displaced toward the coupling spring 232 hooked at the position adjacent to the driven portion 235. Accordingly, the swing support pin 214 is positioned at a rear end portion in the rotary drive direction of the drive plate 210 in the pin slide hole 231 (see FIG. 6). Note that in FIG. 6, the E-ring 214a, the side plate 214b, and the coupling spring 232 are not shown.

Figure 7:
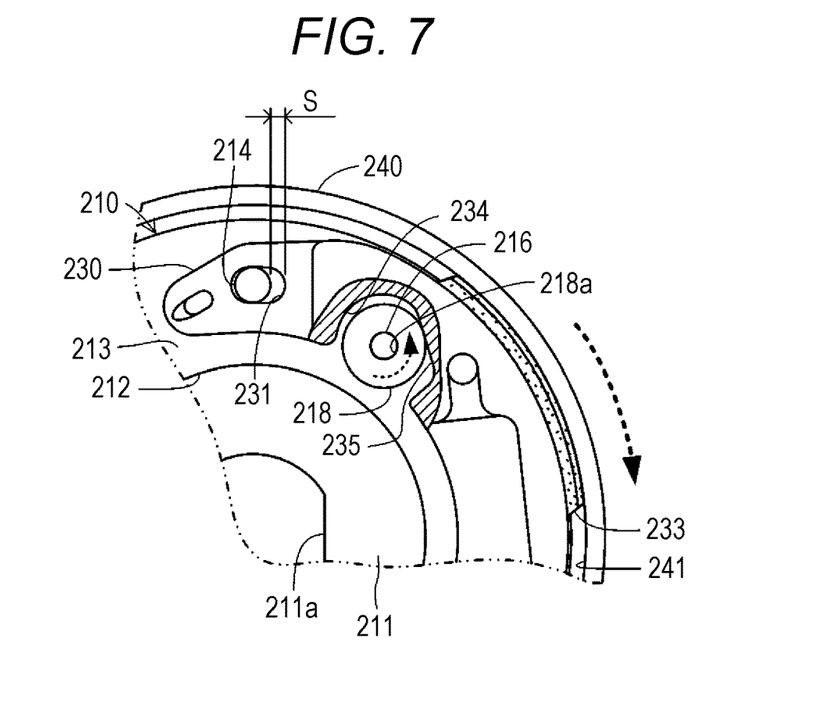
FIG. 7 is a partial enlarged view of a coupling state in which the clutch shoe contacts the clutch outer without the clutch shoe of the centrifugal clutch of FIG. 6 being worn out.

Meanwhile, the centrifugal clutch 200 transmits the rotary drive force of the engine to the drive shaft 133 according to an increase in the engine speed by accelerator operation of a driver of the motorcycle vehicle. Specifically, as illustrated in FIG. 7, the centrifugal force acting on the clutch weight 230 of the centrifugal clutch 200 increases as compared to the elastic force (the pull force) of the coupling spring 232 as the engine speed increases. Then, the clutch weight 230 is rotatably displaced outward in the radial direction about the swing support pin 214.

That is, the clutch weight 230 of the centrifugal clutch 200 is rotatably displaced toward the cylindrical surface 241 of the clutch outer 240 against the elastic force (the pull force) of the coupling spring 232 as the engine speed increases. As a result, the clutch shoe 233 comes into contact with the cylindrical surface 241. Note that in FIG. 7, the E-ring 214a, the side plate 214b, and the coupling spring 232 are not shown. Moreover, in FIGS. 2 and 7, the rotary drive direction of each of the drive plate 210, the clutch outer 240, and the protrusion 218 in the centrifugal clutch 200 is indicated by a dashed arrow.

In a case where the clutch shoe 233 comes into contact with the cylindrical surface 241, the clutch weight 230 receives, via the clutch shoe 233, reactive force in the opposite direction of the rotary drive direction. In this case, the pin slide hole 231 is formed in the long hole shape along the circumferential direction of the drive plate 210. In addition, the swing support pin 214 is positioned at the rear end portion in the rotary drive direction of the drive plate 210 in the pin slide hole 231. That is, the clutch weight 230 is in a state in which backward displacement in the rotary drive direction of the drive plate 210 is allowed. Thus, the clutch weight 230 is relatively displaced in the opposite direction of the rotary drive direction of the drive plate 210 by the reactive force received via the clutch shoe 233.

Accordingly, the driven portion 235 formed at the clutch weight 230 is strongly pressed against the protrusion 218. In this case, the protrusion 218 is rotatably supported on the protrusion support pin 216. Thus, the clutch weight 230 rotates counterclockwise as viewed in the figure by pressing by the driven portion 235. Accordingly, the driven portion 235 of the clutch weight 230 climbs on the protrusion 218 while rotatably displacing the protrusion 218. Thus, the clutch shoe 233 is pressed against the cylindrical surface 241 by the driven portion 235 pressed toward the clutch outer 240 on the outside in the radial direction.

As a result, in the centrifugal clutch 200, the clutch shoe 233 contacts the cylindrical surface 241 of the clutch outer 240. Thereafter, the clutch shoe 233 is pressed against the cylindrical surface 241 within an extremely-short time (in other words, instantaneously). At this point, the centrifugal clutch 200 is in a coupling state in which the rotary drive force of the engine is fully transmitted to the drive shaft 133. That is, the clutch weight 230 is in a state as in a wedge that enters a portion between the protrusion 218 and the clutch outer 240.

In this case, the pin slide hole 231 is formed to have such a length that no contact of the swing support pin 214 occurs when the clutch weight 230 is in the state as in the wedge that enters the portion between the protrusion 218 and the clutch outer 240. That is, a clearance S is ensured even when the clutch weight 230 is in the state as in the wedge that enters the portion between the protrusion 218 and the clutch outer 240. Thus, the pin slide hole 231 does not interfere with entrance of the clutch weight 230 into the portion between the protrusion 218 and the clutch outer 240.

In this coupling state, the clutch shoe 233 of the centrifugal clutch 200 maintains a state in which the clutch shoe 233 is pressed against the cylindrical surface 241 of the clutch outer 240. Thus, the drive plate 210 and the clutch outer 240 are rotatably driven together. Accordingly, the motorcycle vehicle can travel by the rear wheel rotatably driven by the rotary drive force of the engine.

Figure 8:
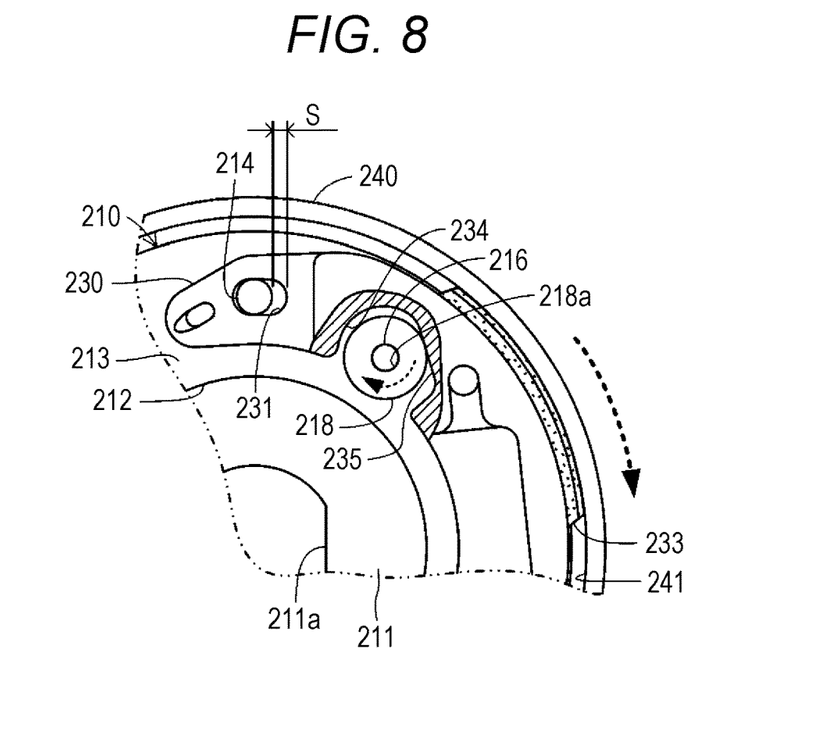
FIG. 8 is a partial enlarged view of a state in which the clutch weight in the centrifugal clutch illustrated in FIG. 7 is inclined inward in a radial direction of the drive plate.

On the other hand, in the case of decreasing the engine speed, the centrifugal clutch 200 blocks transmission of the engine rotary drive force to the drive shaft 133. Specifically, as the engine speed decreases, the centrifugal force acting on the clutch weight 230 of the centrifugal clutch 200 decreases as compared to the elastic force (the pull force) of the coupling spring 232. Then, the clutch weight 230 is rotatably displaced inward in the radial direction about the swing support pin 214.

In this case, the pin slide hole 231 is formed in the long hole shape along the circumferential direction of the drive plate 210 as illustrated in FIG. 8. In addition, the swing support pin 214 is positioned near a front end portion in the rotary drive direction of the drive plate 210 in the pin slide hole 231. That is, the clutch weight 230 is in a state in which forward displacement in the rotary drive direction of the drive plate 210 is allowed. Thus, by the elastic force (the pull force) of the coupling spring 232, the clutch weight 230 is, relative to the drive plate, rotatably displaced forward in the rotary drive direction of the drive plate 210. In this case, the driven portion 235 rotatably displaces the protrusion 218 clockwise as viewed in the figure while the clutch weight 230 is being displaced.

Accordingly, the clutch weight 230 returns to an original position (the position upon idling). That is, the centrifugal clutch 200 is in a disconnection state in which the clutch shoe 233 not contacting the clutch outer 240 does not transmit the rotary drive force. Moreover, the clutch weight 230 is displaced toward the coupling spring 232 (the coupling spring 232 hooked at the position adjacent to the driven portion 235) pulling from the position farther from the swing support pin 214 among two coupling springs 232 coupled to the clutch weight 230.

Accordingly, the swing support pin 214 is positioned at the rear end portion in the rotary drive direction of the drive plate 210 in the pin slide hole 231 (see FIG. 6). Note that in FIG. 8, the E-ring 214a, the side plate 214b, and the coupling spring 232 are not shown. Moreover, in FIG. 8, the rotary drive direction of each of the drive plate 210, the clutch outer 240, and the protrusion 218 in the centrifugal clutch 200 is indicated by a dashed arrow.

Even in a case where the thickness of the clutch shoe 233 is decreased due to wear, the centrifugal clutch 200 can be brought into the coupling state in such a manner that the clutch shoe 233 is promptly pressed against the cylindrical surface 241 of the clutch outer 240. That is, in the centrifugal clutch 200, the protrusion 218 is rotatably attached to the protrusion support pin 216 as illustrated in each of FIGS. 9 and 10. Thus, even in a case where the clutch shoe 233 is worn away, the amount of rotary displacement of the protrusion 218 is increased by an amount corresponding to such a wear amount. This maintains the force of pressing the clutch shoe 233 against the cylindrical surface 241 of the clutch outer 240.

Figure 9:
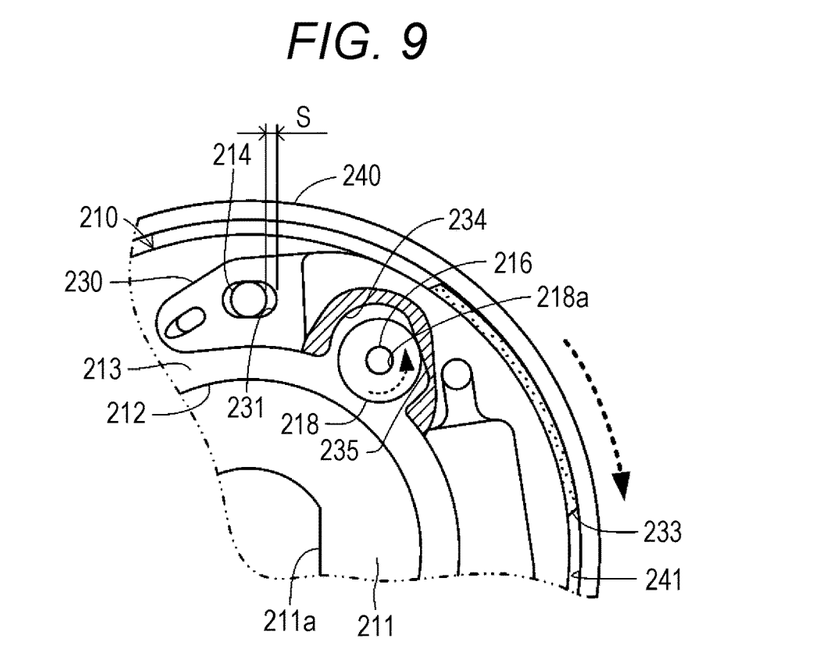
FIG. 9 is a partial enlarged view of a coupling state in which the clutch shoe contacts the clutch outer with a wear of about 1 mm occurring at the clutch shoe in the centrifugal clutch of FIG. 6.
Figure 10:
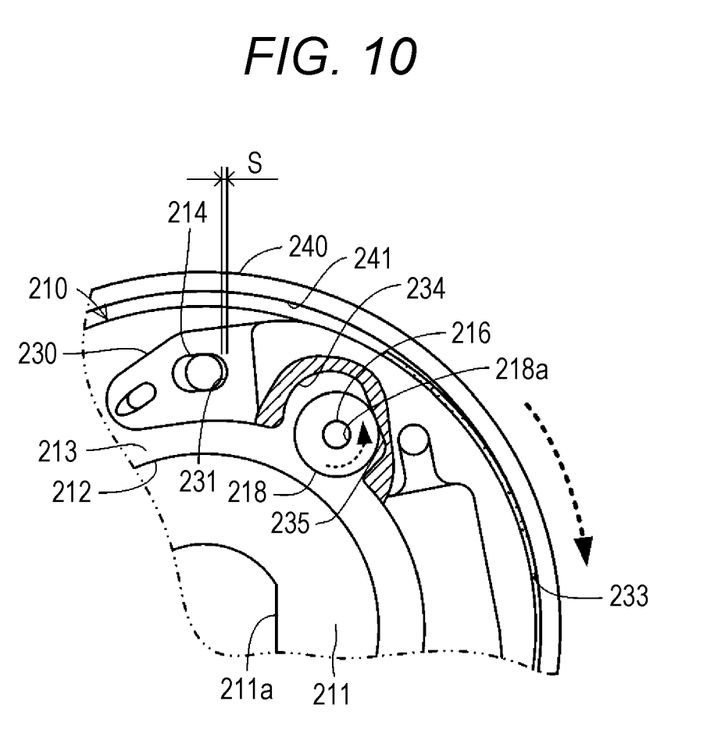
FIG. 10 is a partial enlarged view of a coupling state in which the clutch shoe contacts the clutch outer with a wear of about 2 mm occurring at the clutch shoe in the centrifugal clutch of FIG. 6.

Moreover, in this case, the pin slide hole 231 is formed to have such a length that the clearance S preventing contact of the swing support pin 214 is ensured even when the clutch weight 230 has entered, as in the wedge, the portion between the protrusion 218 and the clutch outer 240 by the amount corresponding to the wear amount of the clutch shoe 233. Thus, even in a case where the clutch weight 230 has entered, as in the wedge, the portion between the protrusion 218 and the clutch outer 240 by the amount corresponding to the wear amount of the clutch shoe 233, the pin slide hole 231 does not interfere with entrance of the clutch weight 230 into the portion between the protrusion 218 and the clutch outer 240.

Note that in FIGS. 9 and 10, each of the E-ring 214a, the side plate 214b, and the coupling spring 232 is not shown. Moreover, in FIGS. 9 and 10, the rotary drive direction of each of the drive plate 210, the clutch outer 240, and the protrusion 218 in the centrifugal clutch 200 is indicated by a dashed arrow.

As seen from description of operation above, according to the present embodiment, the drive plate 210 and the clutch weight 230 of the centrifugal clutch are coupled to each other via the long hole-shaped pin slide hole 231 in which both of the drive plate 210 and the clutch weight 230 are slidably fitted and the swing support pin 214. Thus, when the drive plate 210 is rotatably driven to cause the clutch shoe 233 to contact the clutch outer 240, the clutch weight 230 shifts backward in the rotary drive direction. Then, the driven portion 235 climbs on the protrusion 218. As a result, the clutch shoe 233 quickly presses the clutch outer 240. That is, according to the centrifugal clutch 200, the clutch shoe 233 can be strongly pressed against the clutch outer 240 even by the single drive plate 210. Thus, the clutch capacity can be increased with a simple configuration.

Further, the embodiment of the present invention is not limited to the above-described embodiment. Various changes can be made without departing from the objective of the present invention. Note that in each variation below, the same reference numerals are used to represent components similar to those of the above-described embodiment, and description thereof will be omitted.

For example, in the above-described embodiment, the centrifugal clutch 200 has the swing support pins 214 provided at the drive plate 210, and the pin slide holes 231 provided at the clutch weights 230. However, one of the swing support pin 214 or the pin slide hole 231 may be provided at the drive plate 210 or the clutch weight 230, and the other one of the swing support pin 214 or the pin slide hole 231 may be provided at the clutch weight 230 or the drive plate 210. Thus, the centrifugal clutch 200 may have the swing support pins 214 provided at the clutch weights 230, and the pin slide holes 231 provided at the drive plate 210.

Moreover, in the above-described embodiment, the pin slide hole 231 includes the arc-shaped through-hole. However, the pin slide hole 231 may be formed as the long hole allowing backward displacement of the clutch weight 230 in the rotary drive direction of the drive plate 210 when the clutch shoe 233 of the clutch weight 230 is in a state in which the clutch shoe 233 is most separated from the cylindrical surface 241 of the clutch outer 240 (see FIG. 6). The shape of the pin slide hole 231 is not limited to that of the above-described embodiment.

Thus, the pin slide hole 231 may be formed in a linear shape extending in a tangential direction perpendicular to the radial direction of the drive plate 210. Alternatively, the pin slide hole 231 may include a so-called blind hole opening on one side and closed on the other side.

Further, in the above-described embodiment, the pin slide hole 231 is formed as the long hole having such a length that the clearance S for preventing collision of the swing support pin 214 is ensured even in a case where the clutch weight 230 is displaced backward in the rotary drive direction of the drive plate 210. Thus, according to the centrifugal clutch 200, the driven portion 235 can sufficiently climb on the protrusion 218 when the clutch weight 230 is displaced backward in the rotary drive direction of the drive plate 210. Thus, the clutch shoe 233 can be more strongly pressed against the clutch outer 240.

However, in a case where the clutch weight 230 is displaced backward in the rotary drive direction of the drive plate 210, the pin slide hole 231 can be formed as the long hole having a length allowing contact of the swing support pin 214. According to this configuration, in the centrifugal clutch 200, the swing support pin 214 comes into contact with the end portion of the pin slide hole 231 when the clutch weight 230 is displaced backward in the rotary drive direction of the drive plate 210. This restricts climbing of the driven portion 235 on the protrusion 218. Thus, the force of pressing the clutch shoe 233 against the clutch outer 240 can be restricted.

In addition, in the above-described embodiment, the pin slide hole 231 of the centrifugal clutch 200 is made of the material less resistant to wear than the swing support pin 214, specifically the zinc material. Thus, the pin slide hole 231 of the centrifugal clutch 200 is made of the material less resistant to wear than the swing support pin 214. Consequently, the pin slide hole 231 is more easily worn away than the swing support pin 214. In this case, the pin slide hole 231 is formed as the clutch weight 230 including the clutch shoe 233. Thus, the clutch weight 230 having the worn-away clutch shoe 233 is updated by replacement. That is, by the process of replacing the clutch weight 230 having the worn-away clutch shoe 233, the pin slide hole 231 of the centrifugal clutch 200 can be also replaced with a new slide hole at the same time. Thus, a maintenance burden can be reduced.

Moreover, in the above-described embodiment, the coupling spring 232 is bridged between adjacent two of the clutch weights 230. However, the coupling spring 232 may be coupled to the clutch weight 230 such that the force of displacing a tip end side of the clutch weight 230 inward in the radial direction of the drive plate 210 to separate the clutch shoe 233 from the clutch outer 240 is provided.

Figure 11:
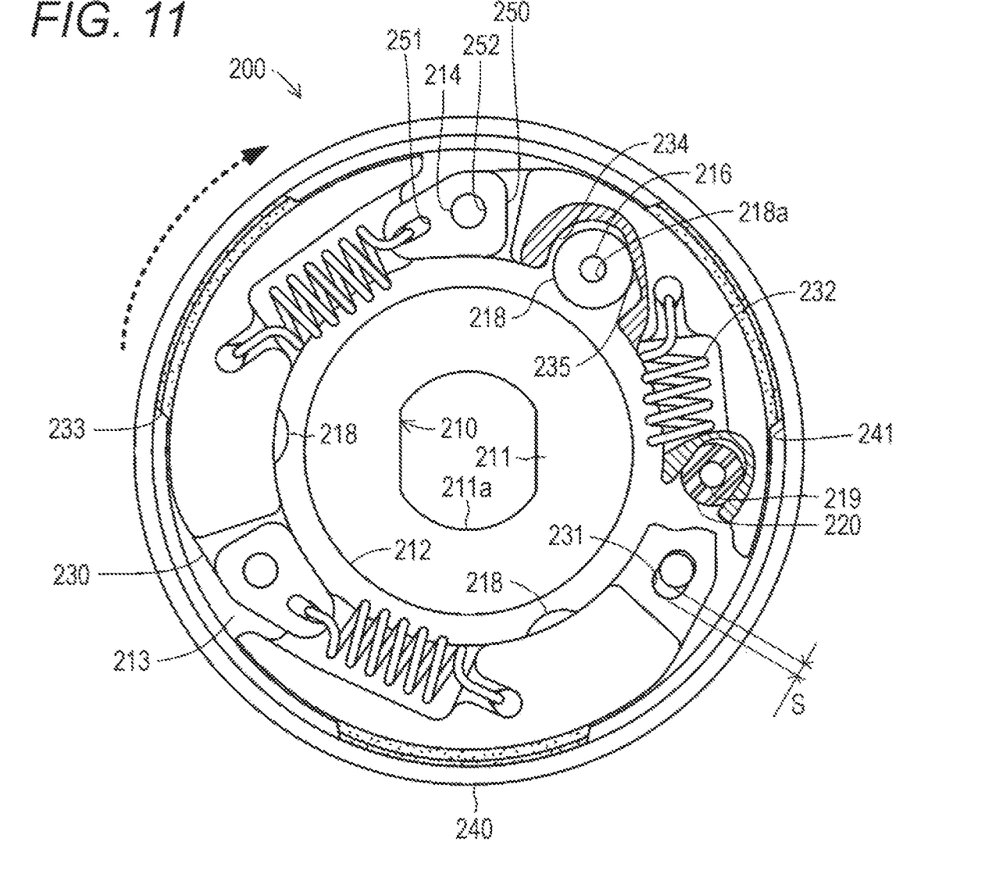
FIG. 11 is a side view of a centrifugal clutch of a variation of the present invention from the 2-2 line illustrated in FIG. 1.
Figure 12:
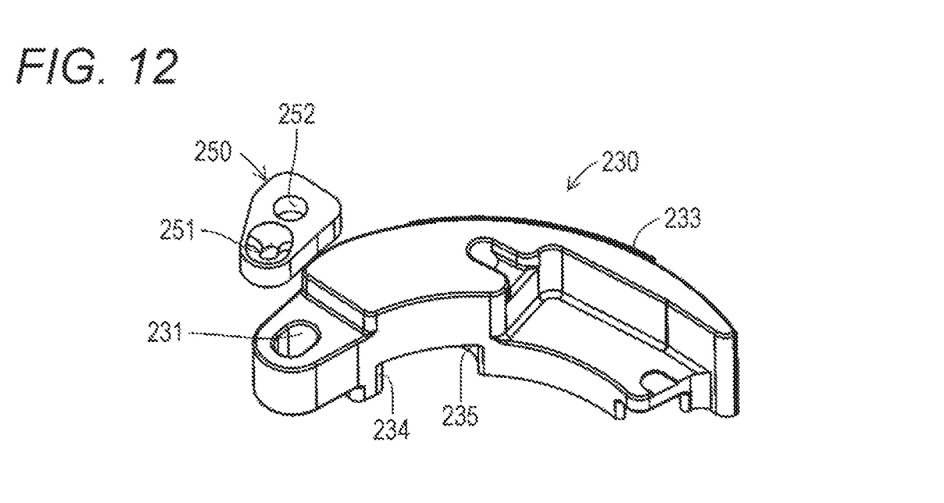
FIG. 12 is a perspective view of an outer appearance configuration of each of the clutch weight and a hook piece in the centrifugal clutch illustrated in FIG. 11.

That is, as illustrated in FIG. 11, one end portion of the coupling spring 232 may be coupled to the tip end side provided with the clutch shoe 233 of the clutch weight 230, and the other end portion of the coupling spring 232 may be attached to other components than the clutch weight 230, such as the drive plate 210, via the swing support pin 214. In this case, a hook piece 250 as a body separated from the clutch weight 230 is provided at the swing support pin 214 as illustrated in FIG. 12.

In this case, the clutch weight 230 is formed such that the thickness of a portion provided with the pin slide hole 231 is thinner by the same thickness as that of the hook piece 250. Thus, even when the hook piece 250 is arranged to overlap with the clutch weight 230, the hook piece 250 is formed flush with the clutch weight 230. Note that in FIG. 11, two spots of one of three clutch weights 230 are each illustrated at different cut planes along the thickness direction for the sake of easy illustration of the configuration of the clutch weight 230. Moreover, the hook piece 250 of another clutch weight 230 is not shown in the figure. Further, in FIG. 11, the E-ring 214a and the side plate 214b are not shown. In addition, in FIG. 11, the rotary drive direction of each of the drive plate 210, the clutch outer 240, and the protrusion 218 in the centrifugal clutch 200 is indicated by a dashed arrow.

The hook piece 250 is a component configured to couple the coupling spring 232 to the swing support pin 214. The hook piece 250 is formed as a metal plate-shaped body, and has a hooking hole 251 on which the coupling spring 232 is hooked and an attachment hole 252 in which the swing support pin 214 is slidably fitted. In the centrifugal clutch 200 having the above-described configuration, the other end portion of the coupling spring 232 is attached to the drive plate 210 via the swing support pin 214. Thus, the clutch shoe 233 can be separated from the clutch outer 240 in such a manner that the tip end side of the clutch weight 230 is more reliably displaced inward in the radial direction of the drive plate 210.

Further, in the above-described embodiment, the protrusion 218 is rotatably attached onto the drive plate 210. However, the protrusion 218 may be attached onto the drive plate 210 in a fixed manner. Alternatively, the protrusion 218 may be made of the same material as that of the drive plate 210, and may be formed integrally with the drive plate 210. In a case where the protrusion 218 is made of the same material as that of the drive plate 210 and is formed integrally with the drive plate 210, the protrusion 218 preferably includes a curved surface including an arc surface having a single curvature or two or more curvatures within a range in which the driven portion 235 is slidable. The numbers of protrusions 218 and driven portions 235 provided at the drive plate 210 and the clutch weights 230 may be each at least one, i.e., one pair or more.

In addition, in the above-described embodiment, the protrusion 218 includes a roller. However, the protrusion 218 may be formed to project outward from an outer peripheral portion of the drive plate 210, and may be formed in a shape pushing the clutch weight 230 outward via the driven portion 235. That is, at least one of the protrusion 218 or the driven portion 235 may be formed to extend outward of the drive plate 210 toward the rear side in the rotary drive direction of the drive plate 210. In this case, the protrusion 218 and the driven portion 235 may be formed to face the rear side in the rotary drive direction of the drive plate 210, and the portion extending outward of the drive plate 210 may be formed as part or the entirety of the protrusion 218 and the driven portion 235. Thus, the protrusion 218 may be a metal material (e.g., carbon steel or iron-based sintered material) in a plate shape.

Moreover, in the above-described embodiment, the protrusion 218 is formed in a roller shape. In addition, the driven portion 235 is formed in a planar shape. However, the protrusion 218 may be formed in a planar shape, and the driven portion 235 may be formed in a rotatable roller shape or an unrotatable fixed curved shape.

Further, in the above-described embodiment, the driven portion 235 of the centrifugal clutch 200 is made of the material less resistant to wear than the protrusion 218, specifically the zinc material. Thus, the driven portion 235 of the centrifugal clutch 200 is made of the material less resistant to wear than the protrusion 218. Thus, the driven portion 235 is more easily worn away than the protrusion 218. In this case, the driven portion 235 is formed as the clutch weight 230 including the clutch shoe 233. Thus, the driven portion 235 is updated by replacement of the clutch weight 230 having the worn-away clutch shoe 233. That is, in the centrifugal clutch 200, the driven portion 235 can be replaced with a new driven portion at the same time by the process of replacing the clutch weight 230 having the worn-away clutch shoe 233. Thus, the maintenance burden can be reduced.

LIST OF REFERENCE NUMERALS

S clearance
100 power transmission mechanism
101 transmission
110 drive pulley
111 crank shaft
112 fixed drive plate
112a radiation fin
113 movable drive plate
114 sleeve bearing
115 roller weight
116 ramp plate
120 V-belt
130 driven pulley
131 fixed driven plate
132 driven sleeve
133 drive shaft
134 movable driven plate
135 torque spring
200 centrifugal clutch
210 drive plate
211 bottom portion
211a through-hole
212 tubular portion
213 flange portion
214 swing support pin
215 attachment bolt
216 protrusion support pin
217 attachment bolt
218 protrusion
218a through-hole
219 damper receiving pin
220 damper
230 clutch weight
231 pin slide hole
232 coupling spring
233 clutch shoe
234 protrusion clearance portion
235 driven portion
240 clutch outer
241 cylindrical surface
250 hook piece
251 hooking hole
252 attachment hole

The invention claimed is:
1. A centrifugal clutch comprising:
a drive plate to be rotatably driven together with a driven pulley in response to drive force of an engine;
a clutch outer positioned outside the drive plate and having a cylindrical surface provided concentrically with the drive plate;

a clutch weight having a clutch shoe formed to extend along a circumferential direction of the drive plate and facing the cylindrical surface of the clutch outer;
a protrusion on the drive plate provided to protrude toward the clutch weight; and
a driven portion provided at the clutch weight,
wherein one end side of the clutch weight in the circumferential direction is rotatably attached onto the drive plate via a swing support pin and a pin slide hole,
the other end side of the clutch weight in the circumferential direction is displaced toward a cylindrical surface side of the clutch outer,
the clutch weight climbs on the protrusion upon displacement of the other end side of the clutch weight,
the swing support pin is provided at one of the drive plate or the clutch weight, and is formed to extend toward the other one of the drive plate or the clutch weight,
the pin slide hole is provided at the other one of the drive plate or the clutch weight, and is formed in an elongated hole shape allowing the one end side of the clutch weight to displace in a direction opposite a rotary drive direction of the drive plate, and
the swing support pin is slidably fitted in the pin slide hole.

2. The centrifugal clutch according to claim 1, wherein the swing support pin is provided at the drive plate, and the pin slide hole is provided at the clutch weight.

3. The centrifugal clutch according to claim 2, wherein the pin slide hole is made of a material less resistant to wear than the swing support pin.

4. The centrifugal clutch according to claim 3, wherein the pin slide hole is formed as the elongated hole shape having such a length that no contact of the swing support pin occurs even when the one end side of the clutch weight is displaced in the direction opposite the rotary drive direction of the drive plate.

5. The centrifugal clutch according to claim 4, wherein at least one of the protrusion or the driven portion includes a rotatably-supported roller.

6. The centrifugal clutch according to claim 3, wherein at least one of the protrusion or the driven portion includes a rotatably-supported roller.

7. The centrifugal clutch according to claim 2, wherein the pin slide hole is formed as the elongated hole shape having such a length that no contact of the swing support pin occurs even when the one end side of the clutch weight is displaced in the direction opposite the rotary drive direction of the drive plate.

8. The centrifugal clutch according to claim 7, wherein at least one of the protrusion or the driven portion includes a rotatably-supported roller.

9. The centrifugal clutch according to claim 2, wherein at least one of the protrusion or the driven portion includes a rotatably-supported roller.

10. The centrifugal clutch according to claim 1, wherein the pin slide hole is formed as the elongated hole shape having such a length that no contact of the swing support pin occurs even when the one end side of the clutch weight is displaced in the direction opposite the rotary drive direction of the drive plate.

11. The centrifugal clutch according to claim 10, wherein at least one of the protrusion or the driven portion includes a rotatably-supported roller.

12. The centrifugal clutch according to claim 1, wherein at least one of the protrusion or the driven portion includes a rotatably-supported roller.

* * * * *